United States Patent
Krishan (10) Patent No.: US 11,825,349 B2
(45) Date of Patent: Nov. 21, 2023

(54) METHODS, SYSTEMS, AND COMPUTER READABLE MEDIA FOR DYNAMIC NETWORK FUNCTION DISCOVERY RESPONSES

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 63 days.

(21) Appl. No.: 17/545,968

(22) Filed: Dec. 8, 2021

(65) Prior Publication Data

US 2023/0180056 A1 Jun. 8, 2023

(51) Int. Cl.
*H04W 28/08* (2023.01)

(52) U.S. Cl.
CPC ... *H04W 28/0835* (2020.05); *H04W 28/0925* (2020.05)

(58) Field of Classification Search
CPC ............ H04W 28/0835; H04W 28/0925
See application file for complete search history.

(56) References Cited

U.S. PATENT DOCUMENTS

| | | | |
|---|---|---|---|
| 10,129,784 B2 | 11/2018 | Chou et al. | |
| 11,050,788 B2 * | 6/2021 | Livanos | H04W 48/16 |
| 11,271,846 B2 * | 3/2022 | Krishan | H04L 45/02 |
| 11,438,828 B2 * | 9/2022 | Sapra | H04L 41/0893 |
| 11,496,954 B2 * | 11/2022 | Gupta | H04W 48/16 |
| 11,570,262 B2 * | 1/2023 | Sapra | H04L 41/08 |
| 11,611,626 B1 * | 3/2023 | Srivastava | H04L 41/122 |
| 11,671,369 B2 * | 6/2023 | Rajput | H04L 67/566 370/235 |
| 2021/0075699 A1 | 3/2021 | Lu et al. | |

(Continued)

FOREIGN PATENT DOCUMENTS

| | | |
|---|---|---|
| CN | 112788585 A | 5/2021 |
| KR | 20190088878 A * | 7/2019 |

(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

(Continued)

*Primary Examiner* — Ahmed Elallam
(74) *Attorney, Agent, or Firm* — Jenkins, Taylor & Hunt, P.A (57) ABSTRACT

A method for updating network function profiles in a telecommunications network includes registering, by a producer network function, a network function profile with a network function repository function (NRF), the network function profile specifying at least one serving scope or discoverable parameters by consumer NFs. The method includes determining that a load level of the producer network function has exceeded a first threshold. The method includes, in response to determining that the load level of the producer network function has exceeded the first threshold, updating the network function profile at the NRF to reduce the serving scope.

20 Claims, 7 Drawing Sheets

(56) References Cited

U.S. PATENT DOCUMENTS

| | | | |
|---|---|---|---|
| 2021/0105665 A1 | 4/2021 | Bennett et al. | |
| 2021/0112443 A1 | 4/2021 | Krishan et al. | |
| 2021/0385286 A1* | 12/2021 | Wang | H04L 61/4511 |
| 2022/0377579 A1* | 11/2022 | Wang | H04W 8/22 |
| 2022/0394597 A1* | 12/2022 | Goel | H04W 48/14 |
| 2023/0019209 A1* | 1/2023 | Rajput | H04L 41/12 |
| 2023/0171255 A1* | 6/2023 | Kuravangi-Thammaiah | H04L 63/10 |
| | | | 726/7 |

FOREIGN PATENT DOCUMENTS

| | | |
|---|---|---|
| WO | WO 2021/141265 A1 | 7/2021 |
| WO | WO-2021160774 A1 * | 8/2021 |

OTHER PUBLICATIONS

"5G; 5G System; Technical Realization of Service Based Architecture; Stage 3 (3GPP TS 29.500 version 16.4.0 Release 16)," ETSI TS 129 500, V16.4.0, pp. 1-82 (Nov. 2020).

"Ultra Cloud Core 5G Session Management Function, Release Mar. 2020—Configuration and Administration Guide," Cisco, pp. 1-5 (Sep. 23, 2020).

"You need a robust signaling solution in 5G too!," Ericsson, pp. 1-9 (Oct. 17, 2019).

Alawe et al., "On the scalability of 5G Core network: the AMF case," 2018 15th IEEE Consumer Communications and Networking Conference, pp. 1-6 (2018).

\* cited by examiner

| # | Load/ Overload Level | Rule | Serving Scope |
|---|---|---|---|
| 302 → 1 | 55% | SUPI range = A-B | Scope1 |
| 304 → 2 | 70% | DNN = "dnn1" | |
| 306 → 3 | 90% | SUPI range = X-Y<br>DNN = "dnn2" | Scope2 |

FIG. 3A

| # | Load/ Overload Level | Rule | Serving Scope |
|---|---|---|---|
| 308 → 1 | 60% | ipDomain = "domain1" | |
| 310 → 2 | 75% | DNN = "dnn1" | |
| 312 → 3 | 90% | ipDomain = "domain2"<br>DNN = "dnn2" | scope1 |

FIG. 3B

| # | NF Type | Load Level | Rule | Serving Scope |
|---|---------|------------|------|---------------|
| 402 → 1 | PCF | 55% | SUPI range = A-B | Scope1 |
| 404 → 2 | PCF | 70% | DNN = "dnn1" | |
| 406 → 3 | PCF | 90% | SUPI range = X-Y<br>DNN = "dnn2" | Scope2 |

FIG. 4A

| # | Load/ Overload Level | Rule | Serving Scope |
|---|---------------------|------|---------------|
| 408 → 1 | 60% | ipDomain = "domain1" | |
| 410 → 2 | 75% | DNN = "dnn1" | |
| 412 → 3 | 90% | ipDomain = "domain2"<br>DNN = "dnn2" | scope1 |

METHODS, SYSTEMS, AND COMPUTER READABLE MEDIA FOR DYNAMIC NETWORK FUNCTION DISCOVERY RESPONSES

TECHNICAL FIELD

The subject matter described herein relates to telecommunications networks. More particularly, the subject matter described herein relates to methods, systems, and computer readable media for dynamic network function discovery responses.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

When a producer NF rejects traffic due to being in an overloaded state, the consumer NF then has to retry at an alternate producer NF. The consumer NF may select, e.g., another producer NF for initial messages or an alternate producer for subsequent messages based on, e.g., binding context. Therefore, during overload handling at the producer NF, the traffic shed by the producer NF can have a large impact on overall latency, throughput, and network utilization due to rejected traffic, since it requires a retry at the consumer NF for an alternate producer NF.

In light of these and other difficulties, there exists a need for methods, systems, and computer readable media for dynamically adjusting discoverable parameters of producer NF for discovery responses.

SUMMARY

A method for updating network function profiles in a telecommunications network includes registering, by a producer network function, a network function profile with a network function repository function (NRF), the network function profile specifying at least one serving scope. The method includes determining that a load level of the producer network function has exceeded a first threshold. The method includes, in response to determining that the load level of the producer network function has exceeded the first threshold, updating the network function profile at the NRF to reduce the serving scope. Computer systems and non-transitory computer readable media may implement the method.

According to another aspect of the subject matter described herein, the method includes determining that the load level of the producer network function has dropped below the first threshold and, in response to determining that the load level has dropped below the first threshold, updating the network function profile at the NRF to restore the serving scope.

According to another aspect of the subject matter described herein, the method includes determining that the load level of the producer network function has exceeded a second threshold greater than the first threshold, and, in response to determining that the load level of the producer network function has exceeded the second threshold, updating the network function profile at the NRF to further reduce the serving scope.

According to another aspect of the subject matter described herein, the producer network function is a policy control function (PCF), and wherein the serving scope comprises a range of subscriber identifiers or a range of data network identifiers or both.

According to another aspect of the subject matter described herein, the producer network function is a binding support function (BSF), and wherein the serving scope comprises a range of domains or a range of data networks or both.

According to another aspect of the subject matter described herein, the method includes receiving the threshold from a telecommunications operator for the telecommunications network.

According to another aspect of the subject matter described herein, the method includes receiving the reduced serving scope for the threshold from the telecommunications operator.

According to another aspect of the subject matter described herein, the method includes receiving input from the telecommunications operator for enabling and disabling load-based reduced serving scope.

According to another aspect of the subject matter described herein, a method for updating network function discovery responses in a telecommunications network includes registering, at a network function repository function (NRF), a network function profile for a producer network function, the network function profile specifying at least one serving scope. The method includes determining that a load level of the producer network function has exceeded a first threshold. The method includes, in response to determining that the load level of the producer network function has exceeded the first threshold, excluding the producer network function from a first response to a first network function discovery request within the serving scope specified in the network function profile. Computer systems and non-transitory computer readable media may implement the method.

According to another aspect of the subject matter described herein, the method includes determining that the load level of the producer network function has dropped below the first threshold and, in response to determining that the load level has dropped below the first threshold, including the producer network function within a second response to a second network function discovery request within the service scope specified in the network function profile.

According to another aspect of the subject matter described herein, the example producer network function is a policy control function (PCF), and wherein the serving scope comprises a range of subscriber identifiers or a range of data network identifiers or both.

According to another aspect of the subject matter described herein, the example producer network function is a binding support function (BSF), and wherein the serving scope comprises a range of domains or a range of data networks or both.

According to another aspect of the subject matter described herein, the method includes receiving the threshold from a telecommunications operator for the telecommunications network.

According to another aspect of the subject matter described herein, the method includes receiving input from the telecommunications operator for enabling and disabling load-based reduced serving scope.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for dynamic network function discovery responses.

In 5G telecommunications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

A NF instance registers with a NRF and provides its profile information by a network function profile. The NF profile can include a serving scope that specifies what other kinds of NFs can be served by the NF. For example, the serving scope can specify a range of addresses or identifiers.

A NF service may go into an overloaded state, if one or more consumer NFs keep sending traffic. To handle such scenario, the NF can be configured to enable a load reporting strategy (e.g., as defined by 3GPP) and custom traffic shedding technique.

In systems where load control information (LCI) or overload control information (LCI) are implemented (e.g., as defined by 3GPP) between producer and consumer, consumer NFs may have differential behavior of handling LCI/OCI notifications. For example, a consumer NF may:

Ignore such notifications from the producer NF and keep sending traffic at higher rate.

Process those notifications and apply a local traffic throttling policy. But the traffic which is of higher priority for the consumer NF may be of lower priority for the producer NF (at a given overload level). Thus such traffic is likely to be rejected by the producer NF.

The producer NF can implement a traffic shedding policy based on, e.g., one or more of the following parameters:

Requested method type, data network name (DNN), subscriber identifier range, or the like For example, during an overload level 1, reject any new sessions of DNN type "internet" or new sessions from SUPI range X-Y When a producer NF rejects any traffic during an overload, the rejection would cause the consumer NF to retry at an alternate producer NF. The consumer NF may select another producer NF for initial messages or an alternate producer NF for subsequent messages based on, e.g., binding context. The consumer NF here may be an actual consumer or an intermediate note as SCP or SEPP.

When a producer NF rejects traffic due to being in an overloaded state, the consumer NF then has to retry at an alternate producer NF. The consumer NF may select, e.g., another producer NF for initial messages or an alternate producer for subsequent messages based on, e.g., binding context. Therefore, during overload handling at the producer NF, the traffic shed by the producer NF can have a large impact on overall latency, throughput, and network utilization due to rejected traffic, since it requires a retry at the consumer NF for an alternate producer NF.

The methods, systems, and computer readable media for dynamic network function discovery responses described in this document provide a solution that:

Allows consumer NFs to avoid selecting producer NFs which may reject their messages due to their traffic shedding policy during overload control.

Allows producer NFs to avoid getting into further congestion by removing themselves from possible path to receive lower priority traffic.

Figure 3A:
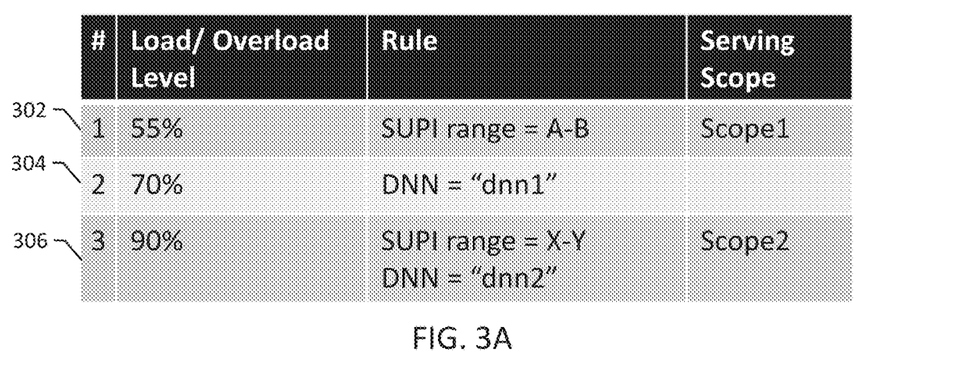
FIGS. 3A-3B are example tables illustrating rules for dynamic network function discovery responses implemented by NF profile updates.
Figure 3B:
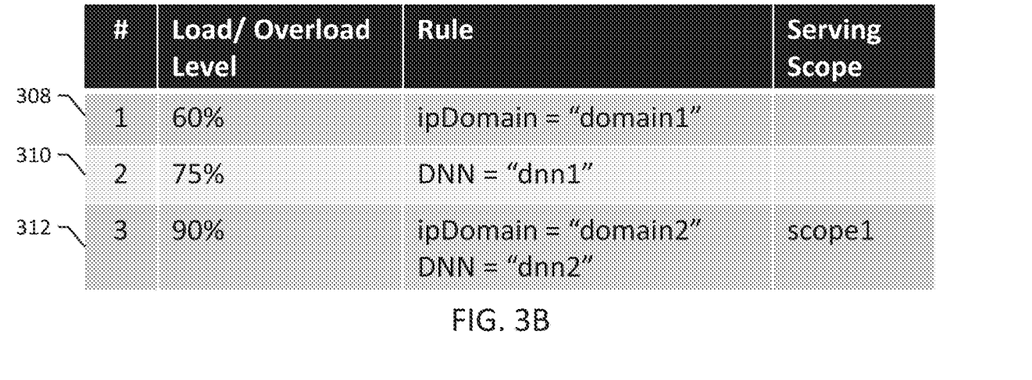
Figure 4A:
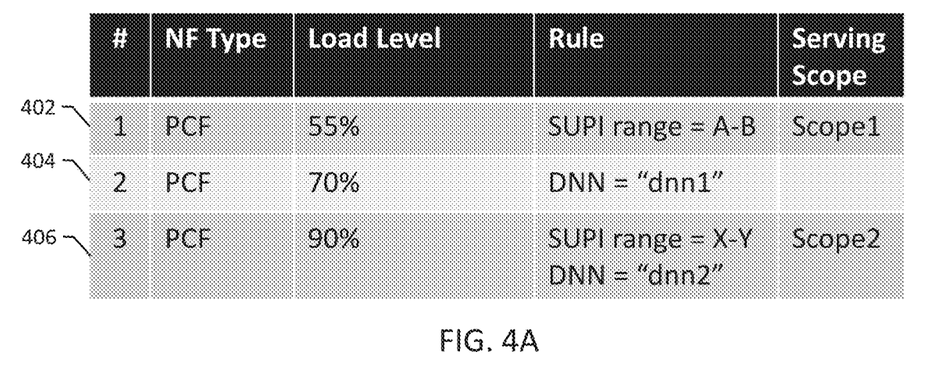
FIGS. 4A-4B are example tables illustrating rules for dynamic network function discovery responses implemented by NRF discovery.
Figure 4B:
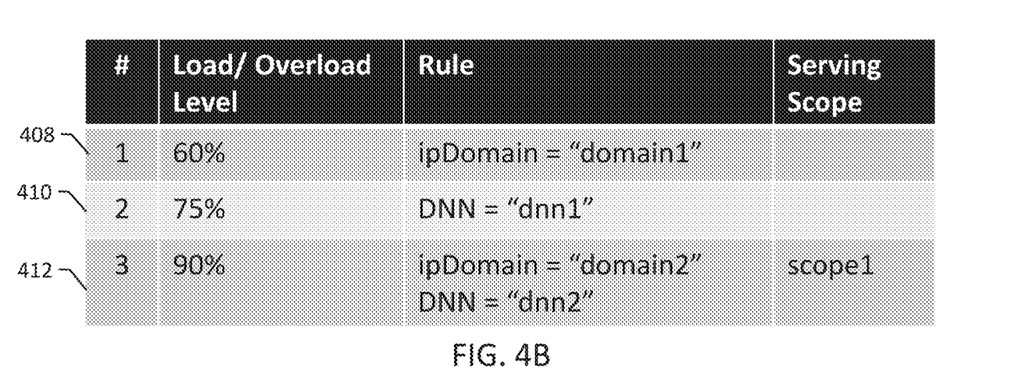
Figure 6:
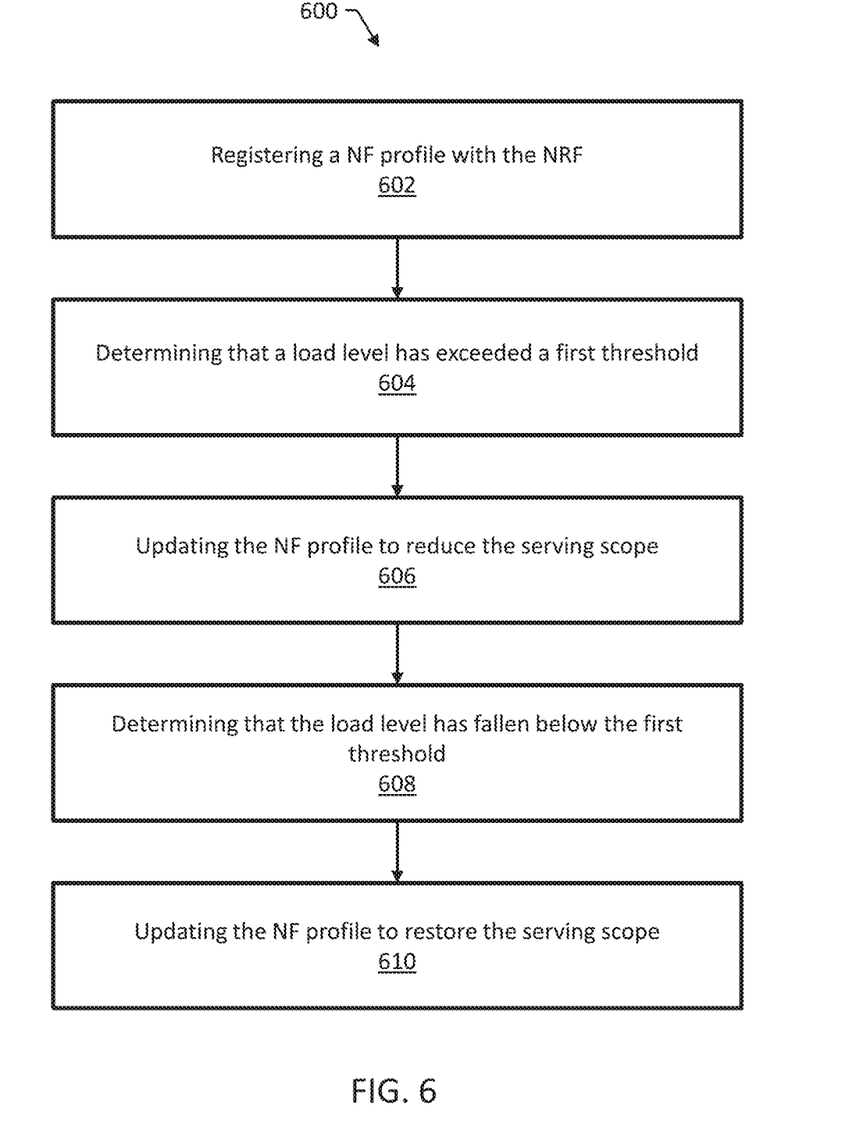
FIG. 6 is a flow diagram of an example method for updating network function profiles in a telecommunications network.
Figure 7:
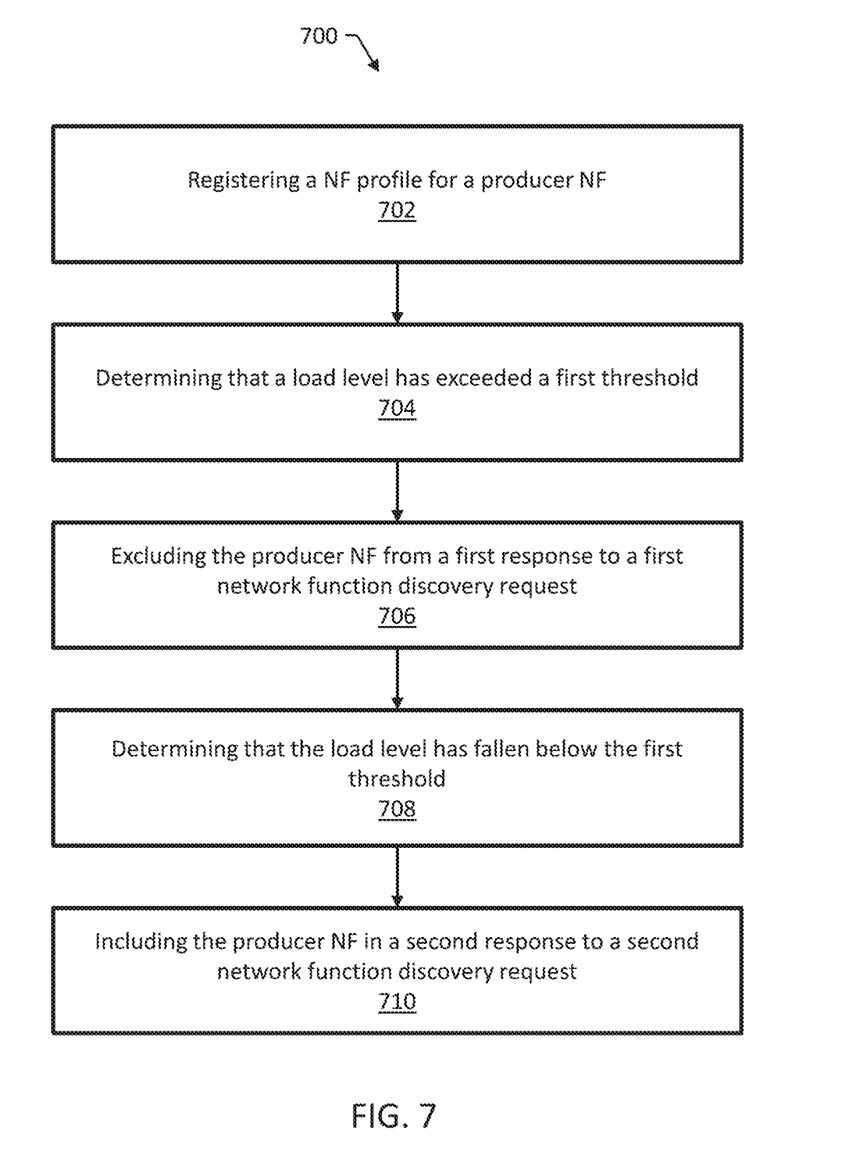
FIG. 7 is a flow diagram of an example method for updating network function discovery responses in a telecommunications network.

The solution can be implemented, for example, as a NF update solution (e.g., as shown in FIGS. 3A-3B and FIG. 6) or as an NRF discovery solution (e.g., as shown in FIGS. 4A-4B and FIG. 7).

Figure 1:
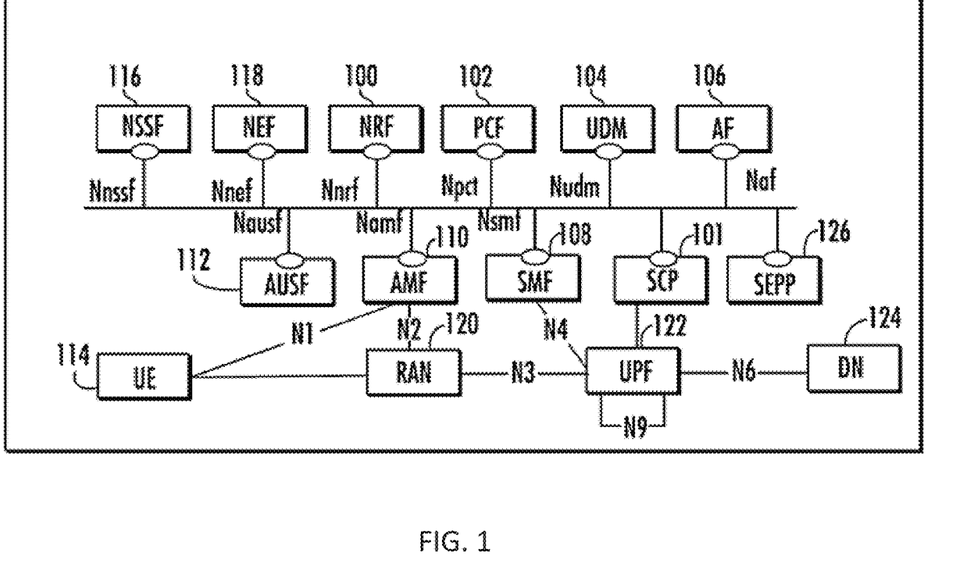
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile can be a JavaScript object notation (JSON) data structure as defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

A producer NF can be configured for updating its NF profile by registering a network function profile with NRF 100, determining that a load level of the producer NF has exceeded a first threshold, and, in response to determining that the load level of the producer NF has exceeded the first threshold, updating the NF profile at NRF 100 to reduce a serving scope specified in the NF profile. NRF 100 can be configured for updating network function discovery responses by registering a NF profile for a producer NF, determining that a load level of the producer NF has exceeded a first threshold, and, in response to determining that the load level of the producer NF has exceeded the first threshold, excluding the producer NF from a first response to a first network function discovery request within a serving scope specified in the NF profile.

This solution can be implemented, in general, in any appropriate NF in a 5G system or other appropriate telecommunications network. The solution can be useful, e.g., to help NFs to adjust their profile based on load level to decrease the number of traffic failures and rejections during overload scenarios, which can have a direct benefit on latency and performance of producer NFs, consumer NFs, and the operator's network.

The solution can be enabled or disabled by an operator during or after deployment, e.g., by an administrator on a user interface. For implementations where the NRF updates the discovery response, there is no impact or behavior change required at producer NFs. The solution can be a complement to the load reporting strategies defined by the 3GPP. The solution has no impact on the Oauth procedure defined by the 3GPP.

Figure 2:
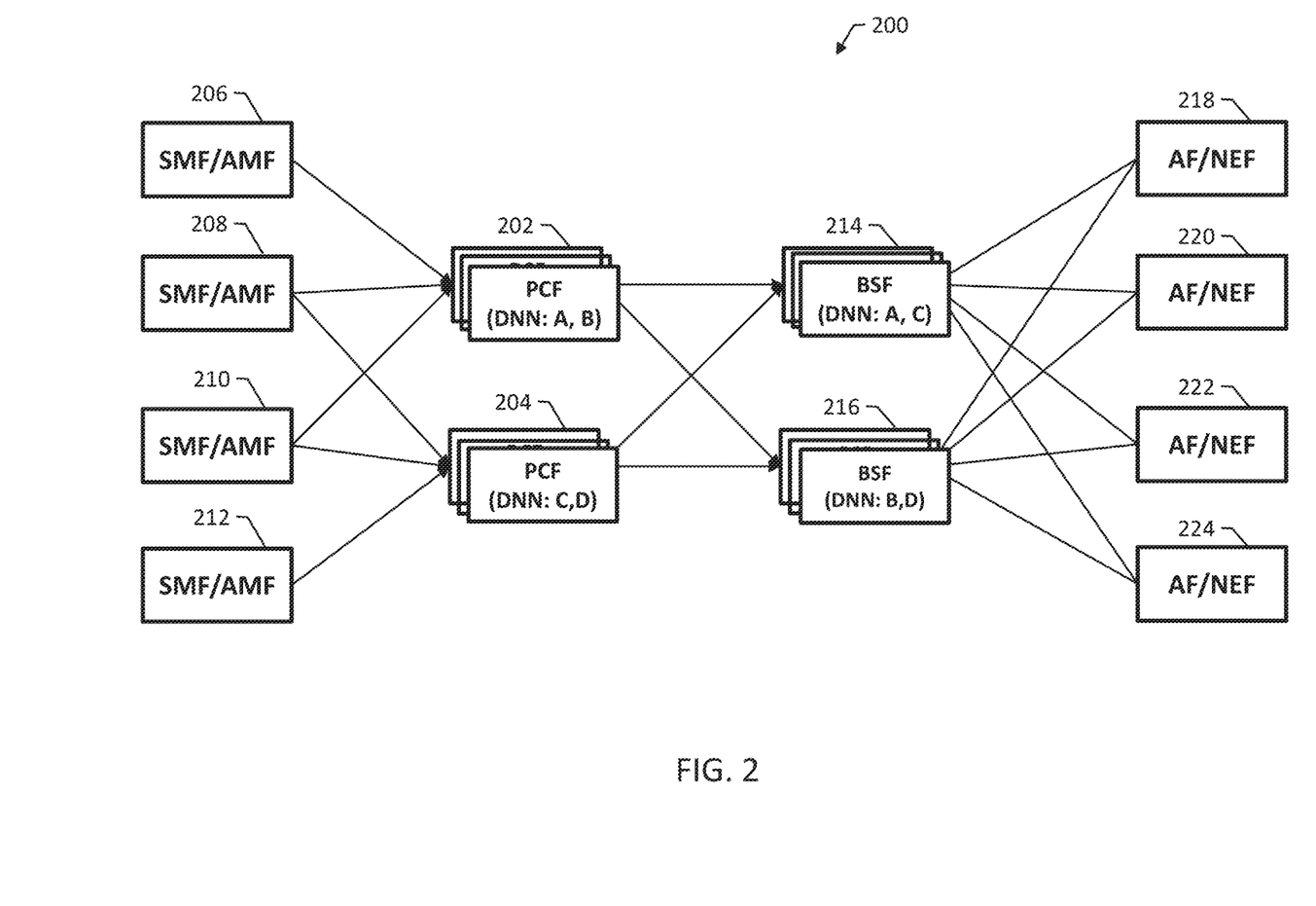
FIG. 2 is a block diagram illustrating a system for policy control function (PCF) and binding support function (BSF) routing.

FIG. 2 is a block diagram illustrating a system 200 for policy control function (PCF) and binding support function (BSF) routing. The system 200 includes a first set of PCF NFs 202 having a first serving scope specifying DNNs A and B. The system 200 includes a second set of PCF NFs 204 having a second serving scope specifying DNNs C and D. In a PCF NF set, each PCF instance may have a subset of superset of other parameters specifying a serving scope, e.g., supiRange, GpsiRanges, ServiceScopes, DnnList. The PCF NF sets 202 and 204 receives messages from SMF/AMFs 206, 208, 210, and 212.

The system 200 includes a first BSF NF set 214 having a first serving scope specifying DNNs A and C. The system 200 includes a second BSF NF set 216 having a second serving scope specifying DNNs B and D. In a BSF NF set, each BSF instance may have a subset or superset of other parameters specifying a serving scope, e.g., DnnList, servingScope, IpDomainList, IP ranges, and the like. The BSF NF sets 214 and 216 route messages to AF/NEFs 218, 220, 222, and 224.

The PCF and BSF instances can each register a NF profile with an NRF, e.g., the NRF 100 of FIG. 1. The profile information can include, for example:

PCF can provide one or more from following in pcfInfo: dnnList, supiRanges, gpsiRanges     BSF can provide one or more from following in bsfInfo: ipv4AddressRanges, dnnList, ipDomainList, ipv6PrefixRanges     PCF/BSF can provide list of servingScope to mark their coverage area.

Note: Multiple instance of PCF/BSF with overlapping PcfInfo/BsfInfo can have overlapping servingScope as well.

The information in pcfInfo and bsfInfo helps PCF/BSF consumers to discover respective PCF instances that support the specified parameters, for example, dnn/supi ranges. Similarly, for other NFs, the profile information helps consumer/SCP/SEPP to reach out for a given service.

The 3GPP specifications support NFSet, ServiceSet, etc. that allow consumers to select alternate producer NF instances to perform alternate routing (if required). The PCF/BSF can provide binding headers that allow their consumer NFs to perform alternate routing.

FIGS. 3A-3B are example tables illustrating rules for dynamic network function discovery responses implemented by NF profile updates. The rules shown in the tables can be specified by an operator of a telecommunications network, e.g., by an administrator using a graphical user interface.

FIG. 3A shows a table of example rules for a PCF. Based on NF type, a telecommunications network operator can configure a list of rules that shall be dropped from the NF profile for the PCF in response to reaching certain load thresholds for the NF. The PCF monitors its load level, and in response to detecting that the load level meets or exceeds one of the specified thresholds, updates its NF profile at the NRF as specified by the rule to limit the scope of its discoverable parameters by consumer NFs. Similarly, when load level drop below specified thresholds, PCF updates its NF profile at the NRF to add the dropped discoverable parameters specified by the rule.

A first row 302 specifies a rule that, at a 55% load level, the PCF will drop SUPI range from A to B and a serving scope of Scope1 from its NF Profile at NRF. A second row 304 specifies a rule that, at a 70% load level, the PCF will drop DNN of "dnn1" from its NF Profile at NRF. A third row 306 specifies a rule that, at a 90% load level, the PCF will drop SUPI range from X to Y, a DNN of "dnn2," and a serving scope of Scope2 from its NF Profile at NRF.

FIG. 3B shows a table of example rules for a BSF. Based on NF type, a telecommunications network operator can configure a list of rules that shall be dropped from the NF profile for the BSF in response to reaching certain load thresholds for the NF. The BSF monitors its load level, and in response to detecting that the load level meets or exceeds one of the specified thresholds, updates its NF profile at the NRF as specified by the rule.

A first row 308 specifies a rule that, at a 60% load level, the BSF will drop ipDomain "domain1" from NF Profile at NRF. A second row 310 specifies a rule that, at a 75% load level, the BSF will drop DNN of "dnn1" from NF Profile at NRF. A third row 312 specifies a rule that, at a 90% load level, the BSF will drop ipDomain "domain2," and DNN of "dnn2," and a serving scope of scope1 from NF Profile at NRF.

A similar configuration can be created by the telecommunications network operator for other supported NFs in its network and for other parameters as supported by NF profiles. The tables shown in FIGS. 3A and 3B do not have to match with every overload level for which traffic shedding is defined. The operator can choose the level at which an NF will report its updated NF profile.

In some cases, it can be useful to keep the load/overload level lower than discard level. For example, if the NF will discard lower priority traffic at 60% for PCF, then it can be useful to configure the PCF to update its profile at 55%.

In implementations where dynamic network function discovery responses are implemented by NF profile updates, the NF can, in response to its load exceeding a threshold, update its NF profile to remove a corresponding entry/element from its profile and trigger PATCH or PUT procedure as defined by NRF in TS 29.510. For the PCF, it can update, e.g., pcfInfo or servingScope parameters in the NF profile. Similarly for the BSF, it can update, e.g., bsfInfo or servingScope parameter in the NF profile. When a NF determines that the load has dropped below the threshold, it updates the NF profile to add a corresponding entry from its profile and trigger PATCH or PUT procedure as defined by NRF in TS 29.510.

FIGS. 4A-4B are example tables illustrating rules for dynamic network function discovery responses implemented by NRF discovery. The rules shown in the tables can be specified by an operator of a telecommunications network, e.g., by an administrator using a graphical user interface.

FIG. 4A shows a table of example rules for a PCF. Based on NF type, a telecommunications network operator can configure a list of rules that the NRF shall run to drop loaded profiles from discovery responses. The PCF monitors its load level and reports the load level to the NRF, e.g., periodically to NRF through Heartbeat requests.

In response to receiving a discovery request at the NRF, the NRF runs its default logic to fetch matching profiles based on discovery criteria. The NRF then removes profiles based on the rules specified by the operator. The NRF sends an updated discovery response to the consumer NF that sent the discovery request.

A first row 402 specifies a rule that, at a 55% load level of a PCF instance, the SUPI range from A to B and a serving scope of Scope1 will be dropped from corresponding PCF Profile, when evaluating discovery response. A second row 404 specifies a rule that, at a 70% load level of a PCF instance, profile supporting DNN of "dnn1." will be dropped from corresponding PCF Profile, when evaluating discovery response. A third row 406 specifies a rule that, at a 90% load level of a PCF instance, SUPI range from X to Y, a DNN of "dnn2," and a serving scope of Scope2 will be dropped from corresponding PCF Profile, when evaluating discovery response.

FIG. 4B shows a table of example rules for a BSF. Based on NF type, a telecommunications network operator can configure a list of rules that the NRF shall run to drop loaded profiles from discovery responses. The BSF monitors its load level and reports the load level to the NRF, e.g., periodically to NRF through Heartbeat requests.

In response to receiving a discovery request at the NRF, the NRF runs its default logic to fetch matching profiles based on discovery criteria. The NRF then removes profiles based on the rules specified by the operator. The NRF sends an updated discovery response to the consumer NF that sent the discovery request.

A first row 408 specifies a rule that, at a 60% load level of a BSF instance, ipDomain "domain1" will be dropped from corresponding BSF Profile, when evaluating discovery response. A second row 410 specifies a rule that, at a 75% load level of a BSF instance, DNN of "dnn1" will be dropped from corresponding BSF Profile, when evaluating discovery response. A third row 412 specifies a rule that, at a 90% load level of BSF instance, ipDomain "domain2," a DNN of "dnn2," and a serving scope of scope1, will be dropped from corresponding BSF Profile, when evaluating discovery response.

Figure 5:
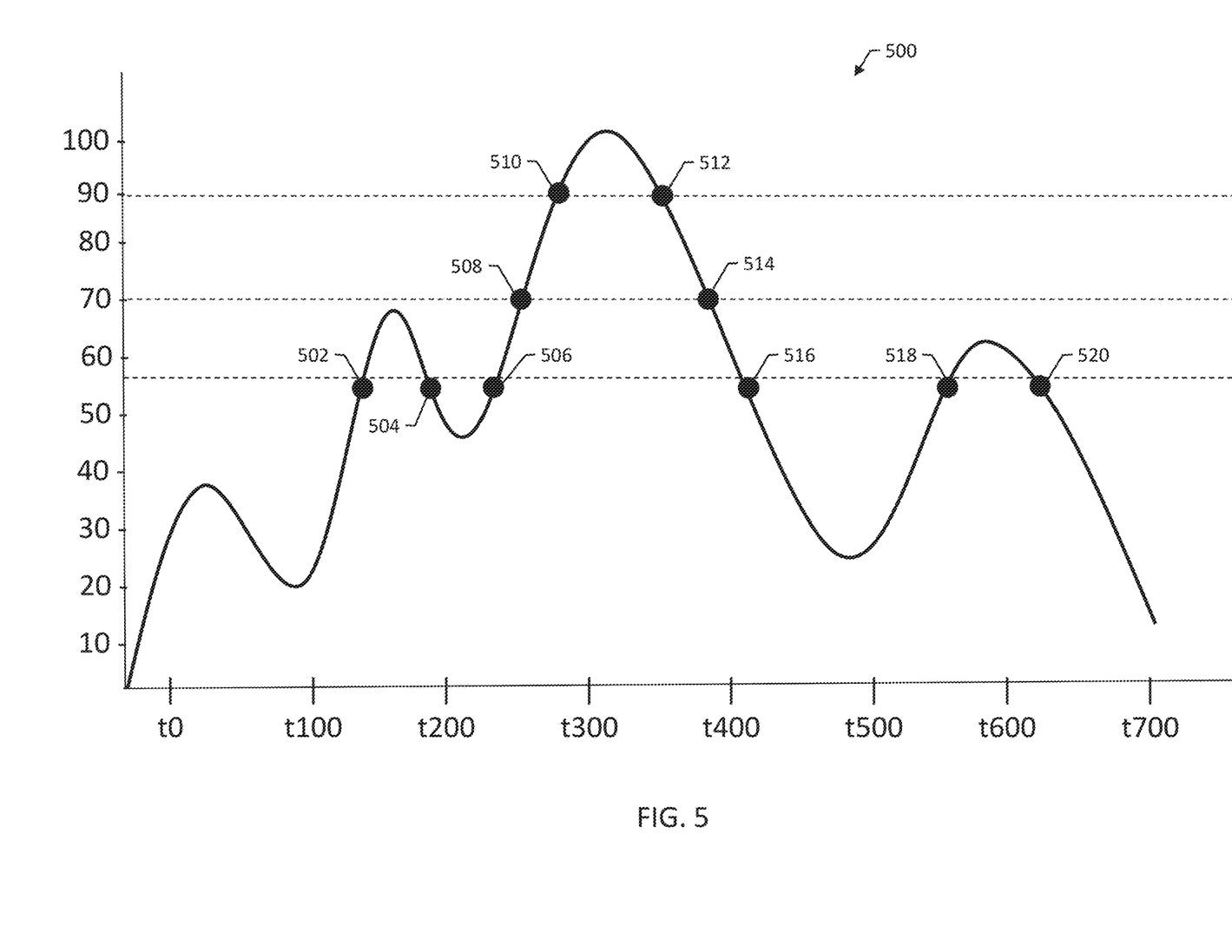
FIG. 5 is a chart illustrating an example scenario for dynamic discovery responses for a PCF.

FIG. 5 is a chart illustrating an example scenario for dynamic discovery responses for a PCF. The chart shows the load level of the PCF on the vertical axis and time along the horizontal axis.

At 502, the load level exceeds a first threshold load level of 55%, causing the PCF to remove SUPI range A-B and servingScope scope1 from its NF profile at the NRF. At 504, the load level drops below the first threshold level, causing the PCF to restore those parameters to its NF profile.

At 506, the load level exceeds a first threshold load level of 55%, causing the PCF to remove SUPI range A-B and servingScope scope1 from its NF profile at the NRF. At 508, the load level exceeds a second threshold load level of 70%, causing the PCF to remove DNN "dnn1" from its NF profile at the NRF. At 510 the load level exceeds a third threshold load level of 90%, causing the PCF to remove from its NF profile SUPI range X to Y, DNN "dnn2," and servingScope "scope2."

At 512, the load level falls below the third threshold and the PCF restores SUPI range X to Y, DNN "dnn2," and servingScope "scope2" to its NF profile. At 514, the load level falls below the second threshold and the PCF restores DNN "dnn1" to its NF profile at the NRF. At 516, the load level falls below the first threshold and the PCF restores SUPI range A-B and servingScope scope1 to its NF profile at the NRF.

At 518, the load level exceeds a first threshold load level of 55%, causing the PCF to remove SUPI range A-B and servingScope scope1 from its NF profile at the NRF. At 520, the load level drops below the first threshold level, causing the PCF to restore those parameters to its NF profile.

FIG. 6 is a flow diagram of an example method 600 for updating network function profiles in a telecommunications network. The method 600 can be performed by a system of one or more computers, e.g., computers implementing a core network of the telecommunications network.

The method 600 includes registering, by a producer network function, a network function profile with a network function repository function (NRF), the network function profile specifying at least one serving scope (602). In some examples, the producer network function is a policy control function (PCF), and the serving scope includes a range of subscriber identifiers or a range of data network identifiers or both. In some examples, the producer network function is a binding support function (BSF), and the serving scope includes a range of domains or a range of data networks or both.

The method 600 includes determining that a load level of the producer network function has exceeded a first threshold (604). The method 600 can include receiving the threshold from a telecommunications operator for the telecommunications network and receiving the reduced serving scope for the threshold from the telecommunications operator, for example, by way of a graphical user interface presented to an administrator. The method 600 can include receiving input from the telecommunications operator for enabling and disabling load-based reduced serving scope.

The method 600 includes, in response to determining that the load level of the producer network function has exceeded the first threshold, updating the network function profile at the NRF to reduce the serving scope (606).

In some examples, the method 600 includes determining that the load level of the producer network function has exceeded a second threshold greater than the first threshold, and, in response to determining that the load level of the producer network function has exceeded the second threshold, updating the network function profile at the NRF to further reduce the serving scope.

The method 600 includes determining that the load level of the producer network function has dropped below the first threshold (608). The method 600 includes, in response to determining that the load level has dropped below the first threshold, updating the network function profile at the NRF to restore the serving scope (610).

When the producer NF changes its profile dynamically, it may impact consumer NFs. For example, the impact on initial sessions may occur as follows:
1. Consumer NFs performing fresh discovery with the NRF will not be able to discover producer NF instances that have removed a certain criteria from its profile.
   Thus NRF will return alternate profiles and consumer NF will setup session with discovered producer instance only.
   When DNN, ServingScope etc parameter are dropped from the NF profile, it will have direct and immediate impact at the producer NF, due to corresponding traffic getting re-directed to other producer instance automatically. This allows "potentially congested" or "congested" producer to avoid getting into "congested" or "over congested" state.
2. Consumer NFs re-using old discovery to select producer NFs that no longer support matching criteria.
   Consumer NF will send request to producer NF.
   Based on current overload and shedding policy, producer NF will apply its traffic shedding policy to either accept or reject the request. If message is rejected by producer due to traffic shredding policy, consumer NF will find an alternate producer from NRF and retry the request.
   This works is as if feature is not enabled at producer and consumer has to retry upon rejection from producer NF.

For subsequent/in-service session, the impact may occur as follows:
1. If a consumer NF is subscribed with NRF for notification of producer NF profiles, it can detect that a given producer NF is no longer serving a given criteria and thus can perform alternate routing based on binding information provided by producer NF (or based on local policy for alternate routing).
2. When SCP/SEPP is there for indirect routing, then it can detect that a given producer NF is no longer serving a given criteria and thus can perform alternate routing based on discovery or routing-binding headers in service request.
3. Consumer NFs may retry to a same producer which has accepted the initial request, but now does not satisfy the criteria:
   Consumer NF will send request to producer NF.
   Based on current overload and shedding policy, producer NF will apply its traffic shedding policy to either accept or reject the request. If message is rejected by producer due to traffic shredding policy, consumer NF will find an alternate producer from NRF and retry the request.
   This works as if the feature is not enabled at producer and consumer has to retry upon rejection from producer NF.

FIG. 7 is a flow diagram of an example method 700 for updating network function discovery responses in a telecommunications network. The method 700 can be performed by a system of one or more computers, e.g., computers implementing a core network of the telecommunications network.

The method 700 includes registering, at a network function repository function (NRF), a network function profile for a producer network function, the network function profile specifying at least one serving scope (702). In some examples, the producer network function is a policy control function (PCF), and the serving scope includes a range of subscriber identifiers or a range of data network identifiers or both. In some examples, the producer network function is a binding support function (BSF), and the serving scope includes a range of domains or a range of data networks or both.

The method 700 includes determining that a load level of the producer network function has exceeded a first threshold (704). The method 700 can include receiving the threshold from a telecommunications operator for the telecommunications network and receiving the reduced serving scope for the threshold from the telecommunications operator, for example, by way of a graphical user interface presented to an administrator. The method 700 can include receiving input from the telecommunications operator for enabling and disabling load-based reduced serving scope.

The method 700 includes, in response to determining that the load level of the producer network function has exceeded the first threshold, excluding the producer network function from a first response to a first network function discovery request within the serving scope specified in the network function profile (706).

In some examples, the method 700 includes determining that the load level of the producer network function has exceeded a second threshold greater than the first threshold, and, in response to determining that the load level of the producer network function has exceeded the second threshold, excluding the producer network function from one or more additional responses to network function discovery requests.

The method 700 includes determining that the load level of the producer network function has dropped below the first threshold (708). The method 700 includes, in response to determining that the load level has dropped below the first threshold, including the producer network function within a second response to a second network function discovery request within the service scope specified in the network function profile (710).

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for updating network function profiles in a telecommunications network, the method comprising:
    registering, by a producer network function, a network function profile with a network function repository function (NRF), the network function profile specifying at least one serving scope;
    determining that a load level of the producer network function has exceeded a first threshold; and
    in response to determining that the load level of the producer network function has exceeded the first threshold, updating the network function profile at the NRF to reduce the serving scope.

2. The method of claim 1, comprising determining that the load level of the producer network function has dropped below the first threshold and, in response to determining that the load level has dropped below the first threshold, updating the network function profile at the NRF to restore the serving scope.

3. The method of claim 1, comprising determining that the load level of the producer network function has exceeded a second threshold greater than the first threshold, and, in response to determining that the load level of the producer network function has exceeded the second threshold, updating the network function profile at the NRF to further reduce the serving scope.

4. The method of claim 1, wherein the producer network function is a policy control function (PCF), and wherein the serving scope comprises a range of subscriber identifiers or a range of data network identifiers or both.

5. The method of claim 1, wherein the producer network function is a binding support function (BSF), and wherein the serving scope comprises a range of domains or a range of data networks or both.

6. The method of claim 1, comprising receiving the threshold from a telecommunications operator for the telecommunications network.

7. The method of claim 6, comprising receiving the reduced serving scope for the threshold from the telecommunications operator.

8. The method of claim 6, comprising receiving input from the telecommunications operator for enabling and disabling load-based reduced serving scope.

9. A method for updating network function discovery responses in a telecommunications network, the method comprising:
    registering, at a network function repository function (NRF), a network function profile for a producer network function, the network function profile specifying at least one serving scope;
    determining that a load level of the producer network function has exceeded a first threshold; and
    in response to determining that the load level of the producer network function has exceeded the first threshold, excluding the producer network function from a first response to a first network function discovery request within the serving scope specified in the network function profile.

10. The method of claim 9, comprising determining that the load level of the producer network function has dropped below the first threshold and, in response to determining that the load level has dropped below the first threshold, including the producer network function within a second response to a second network function discovery request within the service scope specified in the network function profile.

11. The method of claim 9, wherein the producer network function is a policy control function (PCF), and wherein the serving scope comprises a range of subscriber identifiers or a range of data network identifiers or both.

12. The method of claim 9, wherein the producer network function is a binding support function (BSF), and wherein the serving scope comprises a range of domains or a range of data networks or both.

13. The method of claim 9, comprising receiving the threshold from a telecommunications operator for the telecommunications network.

14. The method of claim 13, comprising receiving input from the telecommunications operator for enabling and disabling load-based reduced serving scope.

15. A system for updating network function profiles in a telecommunications network, the system comprising:
    at least one processor and a memory; and a producer network function implemented by the at least one processor and configured for:
registering a network function profile with a network function repository function (NRF), the network function profile specifying at least one serving scope;
determining that a load level of the producer network function has exceeded a first threshold; and
in response to determining that the load level of the producer network function has exceeded the first threshold, updating the network function profile at the NRF to reduce the serving scope.

16. The system of claim 15, wherein the producer network function is configured for determining that the load level of the producer network function has dropped below the first threshold and, in response to determining that the load level has dropped below the first threshold, updating the network function profile at the NRF to restore the serving scope.

17. The system of claim 15, wherein the producer network function is configured for determining that the load level of the producer network function has exceeded a second threshold greater than the first threshold, and, in response to determining that the load level of the producer network function has exceeded the second threshold, updating the network function profile at the NRF to further reduce the serving scope.

18. The system of claim 15, wherein the producer network function is a policy control function (PCF), and wherein the serving scope comprises a range of subscriber identifiers or a range of data network identifiers or both.

19. The system of claim 15, wherein the producer network function is a binding support function (BSF), and wherein the serving scope comprises a range of domains or a range of data networks or both.

20. The system of claim 15, wherein the producer network function is configured for receiving the threshold from a telecommunications operator for the telecommunications network.

* * * * *